(No Model.) 2 Sheets—Sheet 1.

W. McCONWAY.
CAR COUPLING.

No. 553,474. Patented Jan. 21, 1896.

WITNESSES:
Chas. F. Miller.
F. E. Gaither.

INVENTOR,
William McConway
by Darwin S. Wolcott
Att'y.

(No Model.) 2 Sheets—Sheet 2.
W. McCONWAY.
CAR COUPLING.
No. 553,474. Patented Jan. 21, 1896.
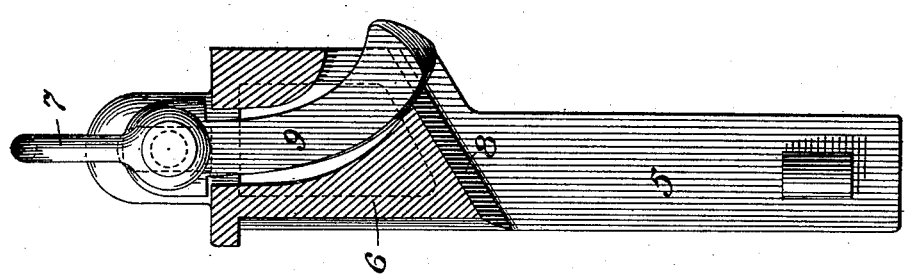
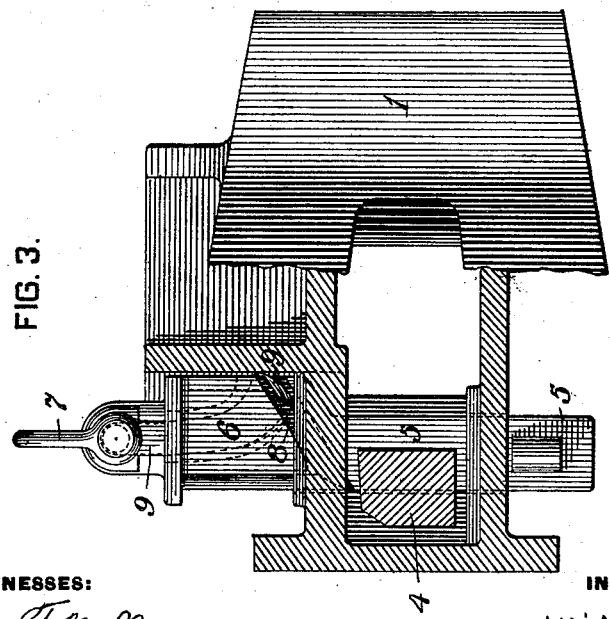
WITNESSES: Chas. F. Miller. F. E. Gauthier.
INVENTOR, William McConway by Dennis S. Wolcott Att'y

UNITED STATES PATENT OFFICE.

WILLIAM McCONWAY, OF PITTSBURG, PENNSYLVANIA, ASSIGNOR TO THE McCONWAY & TORLEY COMPANY, OF SAME PLACE.

CAR-COUPLING.

SPECIFICATION forming part of Letters Patent No. 553,474, dated January 21, 1896.

Application filed November 30, 1895. Serial No. 570,601. (No model.)

*To all whom it may concern:*

Be it known that I, WILLIAM McCONWAY, a citizen of the United States, residing at Pittsburg, in the county of Allegheny and State of Pennsylvania, have invented or discovered certain new and useful Improvements in Car-Couplers, of which improvements the following is a specification.

The invention described herein relates to certain improvements in car-couplers of the Janney or swinging-hook type, wherein a pivotally-mounted knuckle is held in closed position by the engagement of the tail of the knuckle with a movable block or pin; and the object of the invention is to provide a positive lock for the locking block or pin, adapted to prevent any movement of the block or pin from locking position except by the shifting of the pin or block operating mechanism or by the closing movement of the tail of the knuckle.

In general terms, the invention consists in the construction and combination substantially as hereinafter described and claimed.

Figure 1:
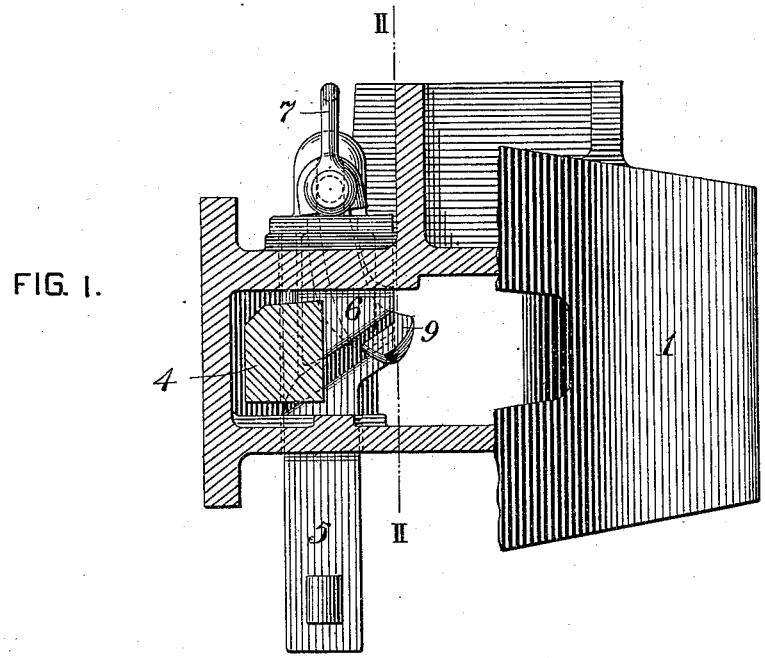
Figure 2:
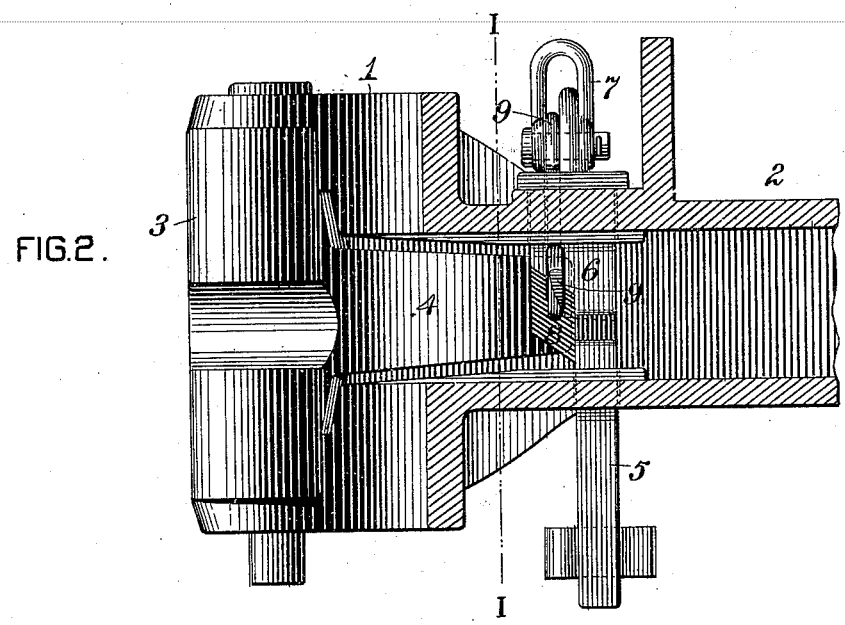

In the accompanying drawings, forming a part of this specification, Figure 1 is a sectional elevation of a swinging-hook coupler having my improvement applied thereto, the plane of section being indicated by the line I I, Fig. 2. Fig. 2 is a view similar to Fig. 1, the plane of section being indicated by the line II II, Fig. 1. Fig. 3 is a view similar to Fig. 1, showing the locking block or pin in raised or unlocking position; and Fig. 4 is a sectional detail view, on an enlarged scale, of the locking block or pin having my improvement applied thereto.

The coupler, consisting of the head 1, shank or barrel 2, knuckle 3, tailpiece 4, and the locking block or pin 5, is constructed in any desired manner, but preferably and especially, as regards the locking block or pin, as described and shown in Letters Patent No. 254,093, dated February 21, 1882. As shown and described in said Letters Patent, the locking block or pin consists of a stem or pin 5, movably arranged in openings in the upper and lower walls of the coupler-head, and a head or block 6, projecting laterally from the stem or pin. The openings in the upper and lower walls of the coupler-head are so arranged that the stem or pin will be outside of the path of movement of the tail of the knuckle, but in such relation thereto that the head or block will, when lowered, project into the path of movement of the tailpiece 4, and, hence, must be shifted in order to permit of the movement of the knuckle. The shifting of the block or head to permit of the opening of the knuckle is effected by any suitable means connected to the pin or block outside of the coupler-head—as, for example, by a handle or lever connected to the link 7, attached to the upper end of the pin or block. The shifting of the pin or block to permit of the closing of the knuckle is effected by the tailpiece 4 striking against the inclined face 8 of the block and forcing it aside. As soon as the tailpiece has passed beyond the block, the latter is moved automatically in front of the tailpiece, thereby locking the knuckle in closed position.

In order to hold the block or pin as against any liability of accidental movement out of the path of movement of the tail of the knuckle, a lock is applied thereto in such manner as to permit of the shifting of the block only by the tail of the knuckle in its closing movement or by the normal block-operating mechanism, as described. A convenient form of lock consists of a bent finger 9, arranged in a slot 10 in the block in such manner that its lower end will normally project beyond the wall of the block sufficiently far to engage the upper wall of the coupler, or other stationary part of the coupler, if the block or pin be raised by means other than those described. The lower end of the finger projects into the path of movement of the tail of the knuckle, so that the latter will strike and force the finger inwardly before the tailpiece effects any material movement of the block by engagement with its inclined face 8. The upper end of the finger is connected to the block-operating link 7, which is connected to an ear or lug 10 on the block. The ear or lug is slotted so as to permit of the shifting of the finger by the link a sufficient distance to unlock the block before the link begins to shift the block.

It is characteristic of my improvement that the block-lock must be shifted prior to any material movement of the block, and that such prior movement can be effected only through the operation of the knuckle or by the normal block-operating mechanism. Hence the block is securely held in locking position as against movement due to irregular movement of the cars or other accidental shifting.

I claim herein as my invention—

1. In a car coupler the combination of a pivotally mounted knuckle provided with a tail piece, a block or pin for holding the knuckle in closed position, and a lock for preventing accidental movement of the block and adapted to be shifted by the tail of the knuckle when moving to closed or locking position, and by the normal block operating mechanism, but held as against an accidental unlocking movement, substantially as set forth.

2. In a car coupler, the combination of a pivotally mounted knuckle provided with a tail piece, a block or pin for holding the knuckle in closed position, and a finger mounted on the block or pin so as to normally engage a stationary part of the coupler and thereby prevent an unlocking movement of the block or pin, and adapted to be shifted to release the block or pin on a closing movement of the knuckle, substantially as set forth.

3. In a car coupler, the combination of a pivotally mounted knuckle provided with a tail piece, a block or pin for holding the knuckle in a closed position, a finger for holding the block or pin in a closed position by engagement with a stationary part of the coupler and adapted to be shifted to release the block or pin on a closing movement of the knuckle, and means connected to the block or finger, and adapted to shift the finger prior to shifting the block or pin from locking position, substantially as set forth.

In testimony whereof I have hereunto set my hand.

WILLIAM McCONWAY.

Witnesses:
F. E. GAITHER,
DARWIN S. WOLCOTT.